United States Patent
Smith et al.

(10) Patent No.: US 9,106,692 B2
(45) Date of Patent: Aug. 11, 2015

(54) SYSTEM AND METHOD FOR ADVANCED MALWARE ANALYSIS

(71) Applicant: NORTHROP GRUMMAN SYSTEMS CORPORATION, Falls Church, VA (US)

(72) Inventors: Calvin H. Smith, Centerville, VA (US); Kenneth Maclean, Hingham, MA (US); Jason J. Liu, Potomac, MD (US); Stephen Mann, Sterling, VA (US); Wendy Mann, Sterling, VA (US); Ryan Chapin, West Friendship, MD (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 13/755,917

(22) Filed: Jan. 31, 2013

(65) Prior Publication Data

US 2014/0215617 A1    Jul. 31, 2014

(51) Int. Cl.
*H04L 29/06* (2006.01)

(52) U.S. Cl.
CPC ................................. *H04L 63/1441* (2013.01)

(58) Field of Classification Search
CPC ......... G06F 21/00; G06F 11/00; G06F 21/53; G06F 21/54; H04L 63/00; H04L 63/145; H04L 63/1441; H04L 29/06
See application file for complete search history.

(56) References Cited

U.S. PATENT DOCUMENTS

| | | | |
|---|---|---|---|
| 2007/0033419 A1* | 2/2007 | Kocher et al. | 713/193 |
| 2009/0064329 A1* | 3/2009 | Okumura et al. | 726/22 |
| 2009/0300589 A1* | 12/2009 | Watters et al. | 717/140 |
| 2009/0325615 A1* | 12/2009 | McKay et al. | 455/466 |
| 2011/0029341 A1* | 2/2011 | Muse et al. | 705/7 |

* cited by examiner

*Primary Examiner* — Chau Le
*Assistant Examiner* — Muhammad Chaudhry
(74) *Attorney, Agent, or Firm* — Andrews Kurth LLP; Sean S. Wooden

(57) ABSTRACT

A system and a method for advanced malware analysis. The method filters incoming messages with a watch-list, the incoming messages including attachments, if an incoming message matches the watch-list, forwards the message to a malware detection engine, strips the attachments from the forwarded message, the one or more attachments including one or more executable files, launches a plurality of sandboxes, executes each of the executable files in the plurality of sandboxes, the sandboxes generating analysis results that may be used to determine whether each executable file is malicious, normalizes the analysis results, evaluates the risk level of the attachments to the forwarded message based on the normalized analysis results of the executable files in the attachments to the forwarded message, and, if the risk level of an attachment to the forwarded message is above a certain level, determines that the forwarded message is malicious and permanently quarantines the forwarded message.

15 Claims, 3 Drawing Sheets

SYSTEM AND METHOD FOR ADVANCED MALWARE ANALYSIS

BACKGROUND

Networks and Information Technology (IT) resources are under constant attack from Advanced Persistent Threat (APT) actors that exploit unknown, "Zero-Day" vulnerabilities. These attacks use spear-phishing emails containing malicious attachments or embedded web links directed at key end-users. APT actors send zero day malware as email attachments to key end-users. Once an end-user system is infected, APT actors use that system to target and exfiltrate sensitive data. APT actors trick end users into downloading and executing zero day malware using social engineering techniques. APT email attacks have resulted in numerous recent security breaches, and they are the prime threat vector targeting a broad range of Government, military, educational, and commercial organizations.

APT exploits are designed to run covertly on networks and systems, quietly collecting sensitive or personal data, and remaining undetected for long periods of time. Usually, standard security tools do not detect the zero day malware employed by APT actors; a recent report stated only 24% of all APT malware is detected by traditional signature-based security software. APT actors often target users and their endpoint platforms using spear-phishing email with embedded zero-day malware.

Zero day malware is malware that targets a vulnerability that is not publicly known, and for which a signature has not yet been developed. Because no signature exists for zero day malware, it cannot be reliably detected by traditional security products. In contrast to signature-based detection techniques, behavioral analysis can reveal the malicious nature of zero day malware.

SUMMARY

Embodiments herein overcome disadvantages described above and provide other advantages. These advantages may be achieved by a method for advanced malware detection. The method filters incoming messages with a watch-list, the incoming messages including attachments, if an incoming message matches the watch-list, forwards the message to a malware detection engine, strips the attachments from the forwarded message, the one or more attachments including one or more executable files, launches a plurality of sandboxes, executes each of the executable files in the plurality of sandboxes, the sandboxes generating analysis results that may be used to determine whether each executable file is malicious, normalizes the analysis results, evaluates the risk level of the attachments to the forwarded message based on the normalized analysis results of the executable files in the attachments to the forwarded message, and, if the risk level of an attachment to the forwarded message is above a certain level, determines that the forwarded message is malicious and permanently quarantines the forwarded message.

These advantages may also be achieved by a system for advanced malware analysis. The system includes an advanced malware detection engine that determines whether a forwarded message is malicious. The advanced malware detection engine receives the forwarded message and strips one or more attachments from the forwarded message, the attachments including one or more executable files. The system also includes a sandbox control manager that receives the executable files and launches a plurality of malware analysis platform (MAP) sandboxes. Tach of the MAP sandboxes execute each of the executable files and produce analysis results indicative of the effects of executing the executable files on a computer system. The system also includes a results normalizer that receives the analysis results from the MAP sandboxes and normalizes the analysis results and a risk evaluator that assigns a risk level to the attachments based on the analysis results and indicates whether the forwarded message is malicious based on the assigned risk level of the attachments of the message.

These advantages may also be achieved by a tangible computer readable medium that includes instructions for performing a method for advanced malware analysis by filtering incoming messages with a watch-list, the incoming messages including one or more attachments, if an incoming message matches the watch-list, forwarding the message to a malware detection engine, stripping the one or more attachments from the forwarded message, the one or more attachments including one or more executable files, launching a plurality of sandboxes, executing each of the one or more executable files in the plurality of sandboxes, the sandboxes generate analysis results that may be used to determine whether each executable file is malicious, normalizing the analysis results, evaluating the risk level of the attachments to the forwarded message based on the normalized analysis results of the executable files in the attachments to the forwarded message and if the risk level of an attachment to the forwarded message is above a certain level, determining that the forwarded message is malicious and permanently quarantining the forwarded message.

BRIEF DESCRIPTION OF DRAWINGS

The detailed description will refer to the following drawings, wherein like numerals refer to like elements, and wherein.

DETAILED DESCRIPTION

Figure 1:
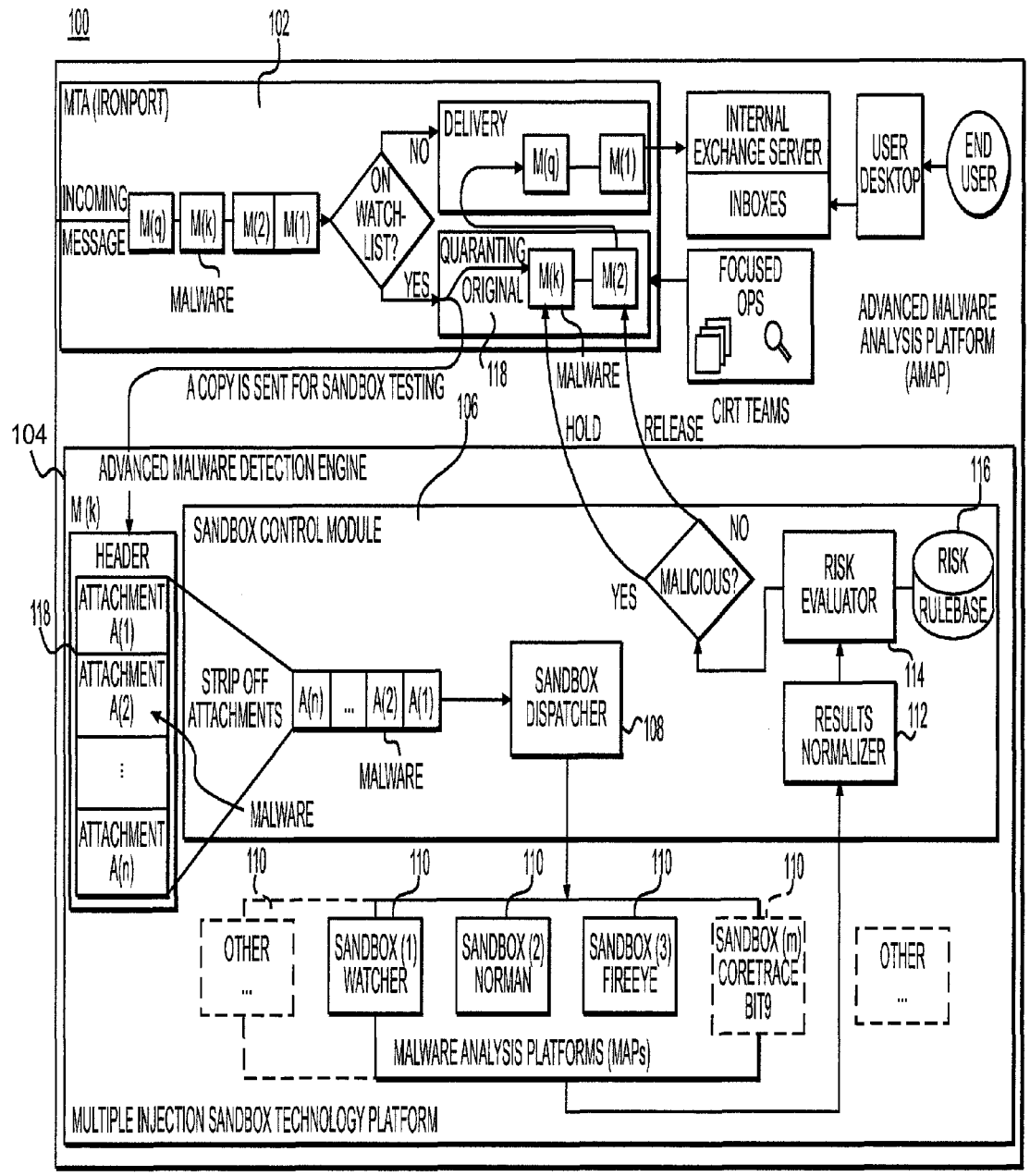
FIG. 1 is a block diagram illustrating an embodiment of a system for advanced malware analysis.

Described herein are embodiments of a system and method for advanced malware analysis. Embodiments overcome the problems described above. Embodiments provide an advanced malware platform (AMP). In embodiments, the AMP is a zero-day malware detection and prevention solution that utilizes a multiple injection sandbox, white-listing technology, and risk based scoring to detect and block APT spear-phishing attacks. Another purpose of the AMP is to detect and block zero-day malware arriving in email attachments with a much higher detection rate than is possible using traditional security technology.

Embodiments of the AMP are designed to protect an enterprise network from malicious email arriving from outside the network. In an implementation, the AMP may be placed at a Trusted Internet Connection (TIC) between the Internet and the enterprise network to intercept inbound malicious email attachments.

Embodiments can be easily added to an existing messaging security tool suite and integrated with a current Message Transfer Agent (MTA) appliance in place at the TIC. Initially, a spear-phishing watch list may be created on the MTA. A watch list is a dynamic list of individuals who may be—or who are—under threat from spear-phishing attacks. Incoming email may be checked against this list. This list may be created by an agency based on internal organizational intelligence of previous attack patterns or other risk factors about specific individuals within the organization (e.g., where they "sit", what they do and where they travel). If there is a match on the watch list filter, all email with attachments are sent to a temporary quarantine queue for malware inspection by the AMP platform. If there are no email attachments, no action takes place.

An embodiment of the AMP includes a sandbox control module (SCM). The AMP strips attachment files from inbound email and automatically launches malware analysis platforms (MAPs) to scan and test attachment files. MAPs are commercially available malware analysis toolsets that provide forensic data on malware behavior. MAP products execute malware in a sandboxed, isolated computing environment and generating forensic data. A sandbox is security mechanism for separating running programs, often used to execute untested code or un-trusted programs. Typically, a sandbox provides a virtual environment for running the untested code or programs. In embodiments, each MAP executes malware within its own sandbox, and the MAP can be either a virtual or a physical machine. Multiple instances of each MAP may be run in parallel to increase system throughput. The MAPs generate forensic data on malware behavior which is analyzed using various white-listing malware inspection techniques. In embodiments, raw data results are analyzed to determine the impact against a known endpoint posture state using anomalous behavior detection, configuration compliance analysis, and other methods.

In embodiments of the system and method, test results from all component MAP sandboxes are normalized and checked against a risk-rule-base. Email that is determined to be high-risk based on its overall risk score is flagged as malware and is not delivered to the end user. Such high-risk e-mail is put in a quarantine queue on the MTA and transferred, along with the MAP analysis results, to advanced cyber threat or focused operation teams for further analysis. In embodiments, e-mails that have a low risk score are released to their intended end users. AMP operation requires "no operator in the loop;" results indicate that embodiments of the AMP can process hundreds of email attachments per hour. Further, embodiments of the AMP are scalable by adding additional AMP controllers and MAPs. Results from the AMP risk-scoring engine have proven to be consistent and repeatable.

In embodiments, the AMP includes a graphical user interface, through which malware scan results, log data, and other reports can be viewed.

Embodiments of the system and method for advanced malware analysis automatically execute suspicious attachments in multiple MAP sandboxes and perform a risk analysis based on the results yielded by each MAP to determine whether the attachment is malware. Each MAP has strengths and weaknesses in its ability to reveal malicious behavior. MAP strengths and weaknesses stem from multiple factors, including compatibility with different file types and verbosity of forensic logging. Furthermore, because malware behaves differently when executed in different computing environments, malicious behaviors that are logged in one MAP are frequently not logged in another. To achieve a high rate of zero day malware detection through behavioral analysis it is necessary to execute malware in multiple MAP tools and to perform a risk analysis of the forensic data provided by each tool. AMP fully automates this functionality.

With reference now to FIG. 1, shown is a block diagram illustrating an embodiment of a system 100 for advanced malware analysis. FIG. 1 is an architectural diagram illustrating an exemplary architecture of the AMP. System 100 may be executed on a high-performance computing platform with multiprocessing operating system kernels or other computing platforms. As shown, the system 100 includes a MTA 102 and an advanced malware detection engine 104. Advanced malware detection engine 104 is a multiple injection sandbox technology platform that includes SCM 106. SCM 106 includes a sandbox dispatcher 108, which may instantiate multiple sandbox MAPs 110. SCM 106 also includes a results normalizer 112, risk evaluator 114 and a risk rule database (or rulebase) 116.

A spear-fishing or other malware watch-list may be created and stored on MTA 102. A watch-list is a dynamic list of individuals or other e-mail recipients who may be—or who are—under threat from spear-phishing or other malware attacks. Since known bad email senders are usually checked and blocked by traditional email filtering mechanism, embodiments avoid duplicating the same effort. In embodiments, a watch-list is a dynamic list of email recipients:

1. Who have been under malware attacks in the past;
2. Who have access to the critical information/infrastructure in the organization; and/or
3. Who are key decision makers in the organization.

A watch-list may be created by an agency based on internal organizational intelligence of previous attack patterns and/or other risk factors about certain individuals within the organization (e.g., where they "sit", what they do, and where they travel). MTA 102 may check incoming messages (e.g., e-mails) M(1)-M(q) against the watch-list. If there is no match on the watch-list, the messages may be delivered (e.g., via internal exchange server(s) to user desktops and end user).

With continued reference to FIG. 1, if, however, there is a match on the watch-list filter, the message (e.g., e-mail M(k)) with all attachments is sent to a temporary queue 118 for malware inspection by advanced malware detection engine 104. If there are no attachments, no action takes place and the message may be delivered per normal. If there are attachments, SCM 106 strips attachments (e.g., attachment A(1)-A(n)) from messages in message queue 118. Sandbox dispatcher 108 launches multiple MAP sandboxes 110 to scan and test attachment files. MAP sandboxes 110 may use various white-listing malware inspection techniques. MAP sandboxes 110 may include a Watcher™ sandbox 110, a Norman™ sandbox 110, and a FireEye™ sandbox 110. Others, such as a CoreTrace Bit9 sandbox 110, may also be provided. Watcher™ technology runs as a virtual machine (VM) that reports on read or write events to the file system, process triggered read or write registry events, creation or destruction of processes, and some network activity. This tool provides no malware detection mechanism, only forensic data. Norman™ is a tool that runs an emulator-based, simulated operating system. Norman™ allows infection, deletion, replication and other functions as in a real system. All behavior is intercepted and converted to forensic intelligence. Norman™ provides no malware detection mechanism, only forensic data. FireEye™ is a hardware appliance capable of running multiple virtual machines (VMs). FireEye™ tests and confirms the presence of malware code after attachments are executed within the VM environments. FireEye™ is able to trace the full execution path of zero-day and known attacks, as well as provide details on malware activity. FireEye™ provides malware detection mechanisms, analysis and forensic data.

Test results for each message's attachment(s), including detected malware, analysis and forensic data, are forwarded from MAP sandboxes 110 to results normalizer 112. Results normalizer 112 normalizes the test results. Embodiments utilize multiple MAPs to detonate/execute malware, collect the artifacts from each MAP's sandbox 110, and analyze the artifacts. In embodiments, each MAP operates independently in its own operational environment:

1. Each MAP runs in its own set of VMs and has its own required OS(operating system), and may have its own user application stack such as Microsoft Office installation, Acrobat Reader, and other user applications;
2. Each MAP requires its own data transfer mechanisms to accept malware input;
3. Each MAP uses its own (usually proprietary) data structure and format to log/report the malware scan results; and
4. Each MAP requires its own data transfer mechanisms to export/transfer the malware scan results.

In embodiments, system 100 infrastructure is designed to accommodate each individual MAP's operational requirements. The SCM 106 automates the malware submission, malware detonation, and scan result collection. The inventors found that attempting to evaluate more than one MAP scan results directly is like comparing German to French. They solved the issue by converting individual MAP's scan results into an AMP internal common data structure so that embodiments can apply the same exclude and risk rules against the output from all the MAPs. This is how embodiments normalize the test results.

The normalized test results are forwarded to risk evaluator 114. Risk evaluator 114 checks normalized test results against risk rule base or rules engine 116. The rule engine 116 is where embodiments analyzes and evaluates the normalized scan result. In an embodiment, the rule engine 116 includes a set of exclude rules, a set of risk rules, and a scan result analyzer. The AMP rules are designed to capture the malware analysts' working knowledge and in-depth understanding of the computer operating systems, and user applications using very specific multi-wildcard and multi-match technology with cumulative rule scoring. The rules allows the analyst to list what area of the operating system are areas of risk to exploit, what level of risk it is (i.e., startup locations in the machine), file type in relation to location, what object is changed, who made the change, and other related information reported by the MAPs. The rules are divided into two categories: Exclude rules and Risk rules. An example of a multi-match cumulative score would be an executable being placed in the windows folder on a PC which would match one rule, but it also matches another rule that score's the executable type file being placed on the hard drive, and it also matches a rule that has any file being saved on the hard drive, adding those three rule scores.

The Exclude rules specify the normal OS behaviors when a file is opened on a user's computer. For example: when a user opens a PDF file, the Acrobat reader process starts. The Acrobat reader process then queries multiple registry keys, opens temporary files, etc. The purpose of the exclude rules is to separate what's considered normal behaviors from the abnormal/malicious behaviors that embodiments try to capture. The Risk rules specify the abnormal/potentially malicious behaviors when a file is opened on a user's computer. Each risk rule is assigned a numeric score to signify how bad the analyst considered the specified behavior to be.

Embodiments offer a flexible user interface where the malware analysts can easily create, modify, tune and delete any rules that are applicable to their organization, as well as generate rules based on exact behavioral analysis of malware that is executed on the system in as little as two (2) mouse clicks.

The scan result analyzer first generates normalized output from the various tools, then runs the normalized scan results through the exclude rules to remove the "normal" behaviors, then runs the remainder of the scan results through the risk rules. Since each risk rules has a risk score, the sum of the risk scores of the triggered risk rules is then captured and assign to the evaluated malware. Any behavior that is not captured by a Risk or an Exclude rule is captured in the Unmatched output list for analyst review.

Based on the above, the risk evaluator 114 assigns an overall risk score to each message. Messages that are determined to be high-risk because of test results for their attachments are assigned a high risk score and flagged as malware. Such messages are not delivered to the end-user. Rather, messages flagged as malware may be held in a quarantine queue 118 on the MTA 102. If a message is determined to be a low-risk and, therefore, assigned a low-risk score, are released for delivery to their intended end-user(s). High risk messages in the quarantine queue 118 may be transferred to an advanced cyber-threat or focused operation team 120 for further forensic analysis. The results of this analysis may be used to further build the risk rulebase 116.

With continued reference to FIG. 1, as noted above, additional MAP sandboxes 110 may be run and attachments analyzed therein. Additional MAP sandboxes 110 may increase the effectiveness of the analysis and increase the malware detection rate. Examples running the Watcher™, Norman™ and FireEye™ sandboxes have shown a malware detection rate of 88%. Furthermore, greater message processing capability may be provided by adding multiple SCMs 106 to advance malware detection engine 104. Additional scalability and performance may be achieved by integrating multiprocessing operating system kernels, integrating advance malware detection engine 104 into a high performance computing platform, using more robust logic rule-bases and risk scoring engine, increasing coverage and analysis from targeted users (identified by spear-phishing list) to all users (i.e., scan all incoming messages and their attachments), creating a knowledge base and self-learning from detected and undetected malware to better recognize zero-day malware from analysis results and dynamically creating APT signatures for use in analysis and detection process.

Figure 2:
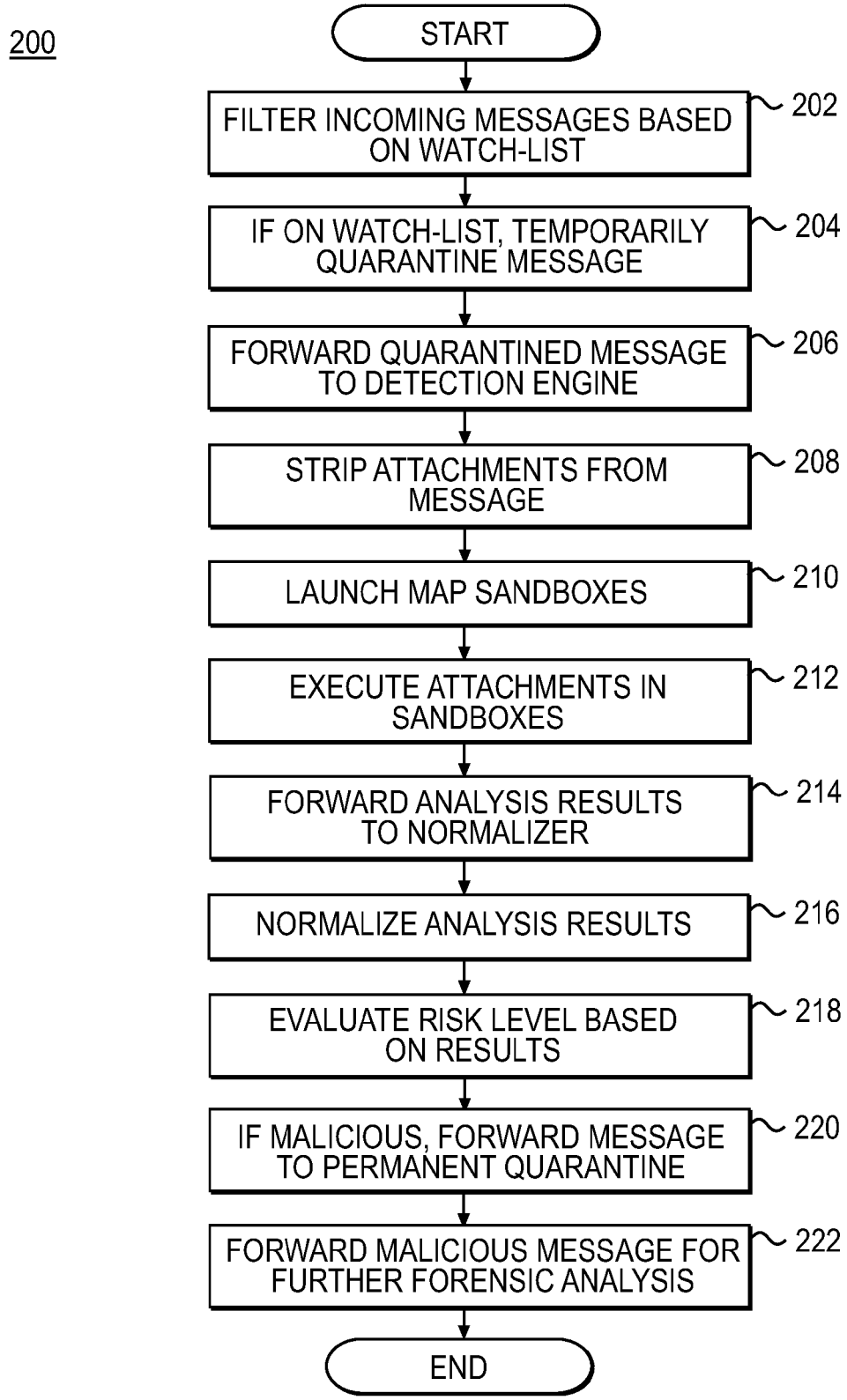
FIG. 2 is a flowchart illustrating an embodiment of a method for advanced malware analysis.

With reference now to FIG. 2, shown is a flowchart illustrating a method 200 for advanced malware analysis. Method 200 may filter incoming messages based on a watch-list, block 202. Watch-list may be a spear-phishing or other malware target list. If method 200 determines that incoming message matches watch-list (e.g., either sender or recipient are on list), message may be temporarily quarantined, block 204, and sent to detection engine (e.g., advanced malware detection engine), block 206. A SCM may strip any attachment(s) from the message, block 208. Sandbox dispatcher may instantiate or otherwise launch a plurality of MAP sandboxes, block 210, and execute attachment files in each of the plurality of MAP sandboxes, block 212.

The MAP sandboxes produce analysis results, which are forwarded to a results normalizer, block 214. Results normalizer normalizes the results from the variety of MAP sandboxes so that these results can be compared, collated and analyzed together, block 216. A risk evaluator evaluates the risk level of the message based on the normalized analysis results for the message's attachments and a comparison of these results to a risk rulebase, block 218. The evaluation 218 compares the normalized analysis results to rules in the risk rulebase. Rules in the risk rulebase indicate a risk level based on the presence of certain analysis results (e.g., if certain registry files are altered by the execution of the executable file in the MAP sandboxes, there is a high risk of the executable file being malicious and a suitably high risk-level is assigned). The evaluation 218 determines whether a message is malicious based on that comparison. If the risk level of any of the attachments to a message are above a threshold, then the evaluation 218 indicates that message is malicious. If the risk evaluator determines that the message is malicious, it sends the message to a permanent quarantine on MTA, block 220. MTA may forward the malicious message to a focused operation or advanced cyber threat team for further forensic analysis, block 222.

Figure 3:
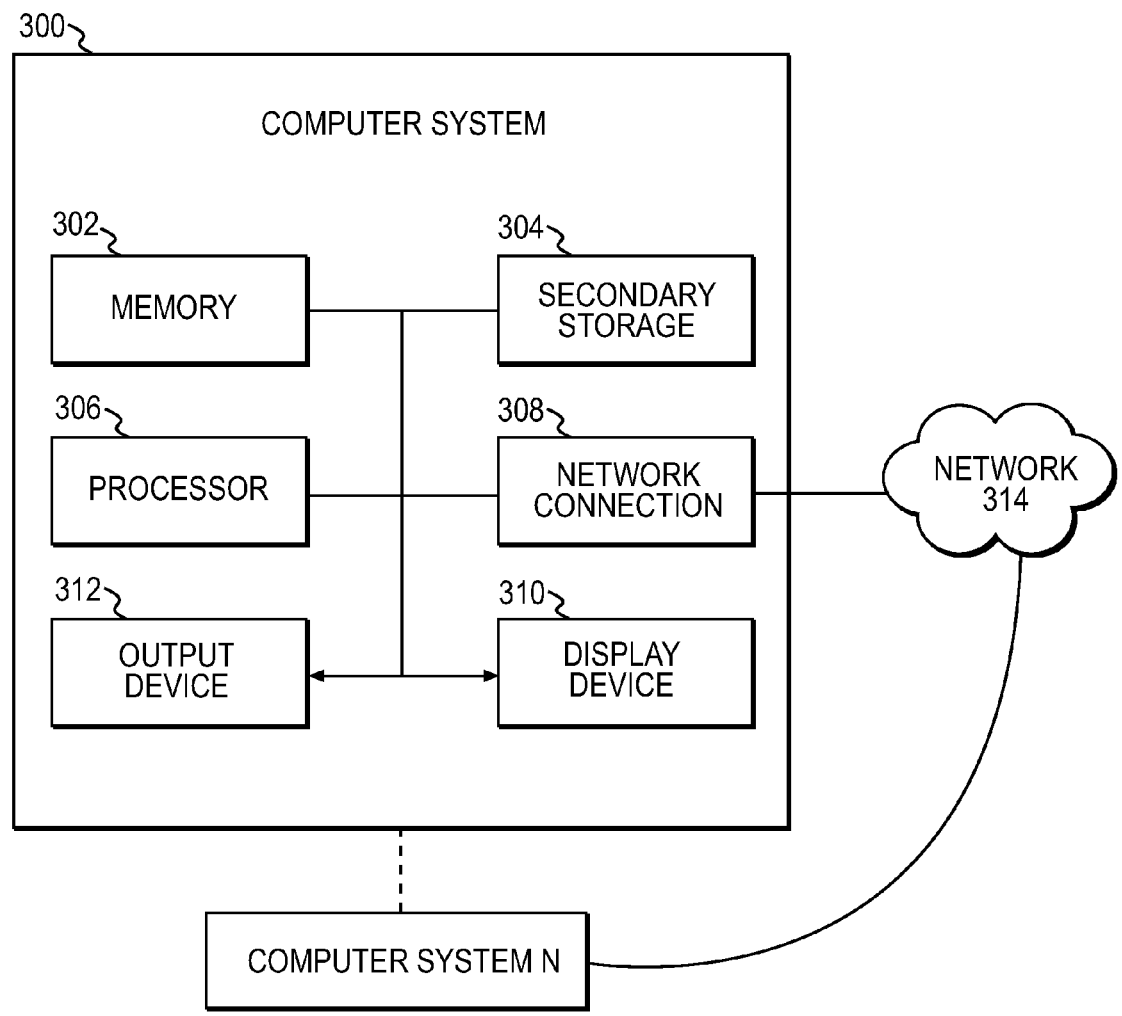
FIG. 3 is a block diagram illustrating exemplary hardware for implementing an embodiment of a system for advanced malware analysis.

With reference now to FIG. 3, shown is a block diagram of exemplary hardware that may be used to provide system 100 and perform method 200 for advanced malware analysis. Exemplary hardware implementation of system 100 may include multiple computing devices 300 (e.g., computing system N). Computing devices 300 may be, e.g., blade servers or other stack servers. For example, each component shown in system 100 may be implemented as software running on one or more computing devices 300. MTA 102 and advanced malware detection engine 104 may be each implemented by software running on one or more separate computing devices 300 (e.g., separate blade server). Alternatively, components and functionality of each may be combined and implemented as software running on a single computing device 300. Likewise, sub-components of advanced malware detection engine 104 (e.g., SCM 106, sandbox dispatcher 108, results normalizer 112, risk evaluator 114 and a risk rule database (or rulebase) 116) may be implemented by one or more computing devices 300. Furthermore, steps of method 200 may be implemented as software modules executed on one or more computing devices 300.

Computing device 300 may include a memory 302, a secondary storage device 304, a processor 306, and a network connection 308. Computing device 300 may be connected a display device 310 (e.g., a terminal connected to multiple computing devices 300) and output device 312. Memory 302 may include RAM or similar types of memory, and it may store one or more applications (e.g., software for performing functions or including software modules described herein) for execution by processor 306. Secondary storage device 304 may include a hard disk drive, DVD-ROM drive, or other types of non-volatile data storage. Processor 306 executes the applications, which are stored in memory 302 or secondary storage 304, or received from the Internet or other network 314. Network connection 308 may include any device connecting computing device 300 to a network 314 and through which information (e.g., including, for example, messages and attachments that are analyzed as described above) is received and through which information (e.g., analysis results) is transmitted to other computing devices. Network connection 308 may include network connection providing connection to internal enterprise network, network connection provided connection to Internet or other similar connection. Network connection 308 may also include bus connections providing connections to other computing devices 300 in system 100 (e.g., other servers in server stack).

Display device 310 may include any type of device for presenting visual information such as, for example, a computer monitor or flat-screen display. Output device 312 may include any type of device for presenting a hard copy of information, such as a printer, and other types of output devices include speakers or any device for providing information in audio form. Computing device 300 may also include input device, such as keyboard or mouse, permitting direct input into computing device 300.

Computing device 300 may store a database structure in secondary storage 304 for example, for storing and maintaining information need or used by the software stored on computing device 300. Also, processor 302 may execute one or more software applications in order to provide the functions described in this specification, specifically in the methods described above, and the processing may be implemented in software, such as software modules, for execution by computers or other machines. The processing may provide and support web pages and other user interfaces.

Although computing device 300 is depicted with various components, one skilled in the art will appreciate that the servers can contain additional or different components. In addition, although aspects of an implementation consistent with the above are described as being stored in memory, one skilled in the art will appreciate that these aspects can also be stored on or read from other types of computer program products or computer-readable media. The computer-readable media may include instructions for controlling a computer system, such as computing device 300, to perform a particular method, such as method 200.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

The invention claimed is:

1. A method for advanced malware analysis comprising:
filtering incoming messages with a watch-list, wherein the incoming messages include one or more attachments;
when an incoming message matches the watch-list, forwarding the message to a malware detection engine;
stripping the one or more attachments from the forwarded message, wherein the one or more attachments include one or more executable files;
launching a plurality of malware analysis platform (MAP) sandboxes, wherein the MAP sandboxes are each of different computing environments;
separately executing each executable file of the one or more executable files in different sandboxes of the plurality of sandboxes such that the same executable file is separately executed in a plurality of different sandboxes, wherein the different sandboxes are each of different computing environments such that each different sandbox runs in a different virtual machine with a different operating system and separately generate analysis results that are used to determine whether each executable file is malicious;
forwarding the separately generated analysis results from each of the different sandboxes to a results normalizer;
normalizing, via the results normalizer, the forwarded analysis results;
evaluating the risk level of the attachments to the forwarded message based on the normalized analysis results of the executable files in the attachments to the forwarded message; and
when the risk level of an attachment to the forwarded message is above a certain level, determining that the forwarded message is malicious and permanently quarantining the forwarded message.

2. The method of claim 1 wherein the separately generated analysis results include forensic data that indicates the effects of executing the executable files in a computer system.

3. The method of claim 1 wherein the separately executing each executable file of the one or more executable files in different sandboxes of the plurality of sandboxes includes executing the executable files in one or more virtual machines.

4. The method of claim 1 a sandbox control module (SCM) performs the launching a plurality of sandboxes.

5. The method of claim 1 wherein the evaluating the risk level of the attachments includes comparing the normalized analysis results to risk rules in a risk rulebase.

6. The method of claim 1 further comprising forwarding the permanently quarantined message for further forensic analysis.

7. The method of claim 1 further comprising temporarily quarantining the incoming message when the incoming message matches the watch-list.

8. The method of claim 1 wherein one or more executable files in one of the plurality of the sandboxes are of a different file type than one or more executable files in another one of the plurality of the sandboxes.

9. A system for advanced malware analysis comprising:
   a computer including a processor and memory, wherein the memory includes instructions that are executed by the processor for:
      an advanced malware detection engine that determines whether a forwarded message is malicious, wherein the advanced malware detection engine receives the forwarded message and strips one or more attachments from the forwarded message, the attachments including one or more executable files;
      a sandbox control manager that receives the executable files and launches a plurality of malware analysis platform (MAP) sandboxes, wherein the MAP sandboxes are each of different computing environments, wherein different sandboxes of the MAP sandboxes separately execute each executable file of the executable files such that the same executable file is separately executed in a plurality of different sandboxes, and wherein the different sandboxes are each of different computing environments such that each different sandbox runs in a different virtual machine with a different operating system and separately produce analysis results indicative of the effects of executing the executable files on a computer system;
      a results normalizer that receives the separately produced analysis results from the different sandboxes and normalizes the separately produced analysis results; and
      a risk evaluator that assigns a risk level to the attachments based on the normalized analysis results and indicates whether the forwarded message is malicious based on the assigned risk level of the attachments of the message.

10. The system of claim 9 wherein the memory further includes instructions that are executed by the processor for a message transfer agent (MTA) that receives a plurality of messages and compares the plurality of messages to a watch-list, and wherein when a message matches the watch-list, the MTA forwards the message to the advanced malware detection engine.

11. The system of claim 9 wherein the MTA temporarily quarantines the forwarded message.

12. The system of claim 9 wherein the MTA receives the indication that the forwarded message is malicious from the risk evaluator and permanently quarantines the forwarded message in response to the indication.

13. The system of claim 9 further comprising a risk rule database that includes risk rules used by the risk evaluator to assign a risk level to the attachments.

14. The system of claim 9 wherein the sandbox control manager further comprises a sandbox dispatcher that launches the plurality of MAP sandboxes.

15. A non-transitory computer readable medium comprising instructions for performing a method for advanced malware analysis by:
   filtering incoming messages with a watch-list, wherein the incoming messages include one or more attachments;
   when an incoming message matches the watch-list, forwarding the message to a malware detection engine;
   stripping the one or more attachments from the forwarded message, wherein the one or more attachments include one or more executable files;
   launching a plurality of malware analysis platform (MAP) sandboxes, wherein the MAP sandboxes are each of different computing environments;
   separately executing each executable file of the one or more executable files in different sandboxes of the plurality of sandboxes such that the same executable file is separately executed in a plurality of different sandboxes, wherein the different sandboxes are each of different computing environments such that each different sandbox runs in a different virtual machine with a different operating system and separately generate analysis results that are used to determine whether each executable file is malicious;
   forwarding the separately generated analysis results from each of the different sandboxes to a results normalizer;
   normalizing, via the results normalizer, the forwarded analysis results;
   evaluating the risk level of the attachments to the forwarded message based on the normalized analysis results of the executable files in the attachments to the forwarded message; and
   when the risk level of an attachment to the forwarded message is above a certain level, determining that the forwarded message is malicious and permanently quarantining the forwarded message.

* * * * *